United States Patent
Kuo et al.

(10) Patent No.: US 8,580,872 B2
(45) Date of Patent: Nov. 12, 2013

(54) SULFOPOLYESTER POLYMER COMPOSITIONS WITH IMPROVED WATER DISPERSIBILITY

(75) Inventors: Thauming Kuo, Kingsport, TN (US); Phillip Bryan Hall, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 13/188,012

(22) Filed: Jul. 21, 2011

(65) Prior Publication Data

US 2013/0023604 A1    Jan. 24, 2013

(51) Int. Cl.
*C09D 167/02* (2006.01)
*C08G 63/688* (2006.01)

(52) U.S. Cl.
USPC ............................ 523/501; 528/293; 528/295

(58) Field of Classification Search
USPC .................................................. 528/293, 295
See application file for complete search history.

(56) References Cited

U.S. PATENT DOCUMENTS

| | | | |
|---|---|---|---|
| 3,033,822 A | 5/1962 | Kibler et al. | |
| 3,075,952 A | 1/1963 | Coover, Jr. et al. | |
| 3,018,272 A | 9/1970 | Lappin et al. | |
| 3,528,947 A | 9/1970 | Lappin et al. | |
| 3,734,874 A | 5/1973 | Kibler et al. | |
| 3,779,993 A | 12/1973 | Kibler et al. | |
| 4,304,901 A | 12/1981 | O'Neill et al. | |
| 5,218,042 A | 6/1993 | Kuo et al. | |
| 5,290,631 A | 3/1994 | Fleury et al. | |
| 5,349,026 A | 9/1994 | Emmons et al. | |
| 5,369,210 A | 11/1994 | George et al. | |
| 6,211,309 B1 | 4/2001 | McIntosh et al. | |
| 6,255,366 B1 | 7/2001 | Adams et al. | |
| 6,444,781 B1 | 9/2002 | Kuo et al. | |
| 8,163,850 B2 | 4/2012 | Marsh et al. | |
| 2002/0086154 A1* | 7/2002 | Miller et al. | 428/347 |
| 2007/0276065 A1 | 11/2007 | Barton et al. | |
| 2008/0092776 A1* | 4/2008 | Stockl et al. | 106/241 |
| 2010/0204392 A1* | 8/2010 | Marsh et al. | 524/539 |

FOREIGN PATENT DOCUMENTS

GB    1 044 015 A    9/1966

OTHER PUBLICATIONS

Zhang, Musan et al., "Tailoring adhesive performance of sulfonated segmented block copolymers", Database CA [Online], Chemical Abstracts Service, XP002682877, Date : 2011.
Notification of Transmittal of The International Search Report and The Written Opinion of The International Search Authority with a Mail Date of Sep. 24, 2012 for International Application No. PCT/US2011/047842.

* cited by examiner

*Primary Examiner* — Ling-Siu Choi
*Assistant Examiner* — Gennadiy Mesh
(74) *Attorney, Agent, or Firm* — James K. Leonard; Dennis V. Carmen

(57) ABSTRACT

A sulfopolyester containing residues of 2,2,4,4-tetralkylcyclobutane-1,3-diol such as 2,2,4,4-tetramethylcyclobutane-1,3-diol is highly dispersible in water. This allows one to reduce the content of sulfonate groups or reduce the amount of ethylene glycol or other hydrophilic glycols to retain good water resistance in cured coatings. The sulfopolyester may also be a reaction product of a 2,2,4,4-tetralkylcyclobutane-1,3-diol along with 1,4-cyclohexanedimethanol, neopentyl glycol, or a mixture thereof with an acid component. Coating compositions may also contain these sulfopolyesters along with water and a polymer resin.

7 Claims, No Drawings

SULFOPOLYESTER POLYMER COMPOSITIONS WITH IMPROVED WATER DISPERSIBILITY

1. FIELD OF THE INVENTION

This invention relates to new sulfopolyester polymer compositions and methods for their preparation and use, and in particular, to sulfopolyester polymers that have improved water dispersibility.

2. BACKGROUND OF THE INVENTION

Sulfopolyester polymers are generally referred to polyesters containing ionic sulfonate ($SO_3^-$) groups, particularly to those synthesized using a sulfomonomer such as, for example, 5-sodiosulfoisophthalic acid (5-SSIPA or SIP) or dimethyl 5-sodiosulfoisophthalate, as one of the diacids in the polyester compositions. Such sulfopolyester polymers are commercially available from Eastman Chemical Company under the Eastman AQ™ family of polymers. The polymers are linear, amorphous polyesters that can be dispersed in water without the assistance of surfactants or amines. This water dispersibility is attributed to the ionic nature of the sulfonate substituents attached to the polymer chains.

The common Eastman AQ™ polymers are Eastman AQ 38S, AQ 48 ultra, and AQ 55S, which have Tg ranging from 35° C. to 55° C. as denoted by the names of the products. Another product, Eastek™ 1200 polymer, has a higher Tg of about 63° C.; it has applications in printing inks, overprints, and primers for industrial wood coatings. The product is capable of providing excellent water resistance, alcohol resistance, and is fast drying. These properties are also desirable for top coat application in wood coatings; as a result, there have been increased interests in Eastek™ 1200 polymer for wood coating application as a top coat. In addition to sulfonate groups, sulfopolyester polymers typically contain the residue of a hydrophilic polyhydroxyl compound such as ethylene glycol (EG), diethylene glycol (DEG), or polyethylene glycol (PEG) in the polymer chains to further impart water dispersibility. Such EG-based glycols, however, are not preferred for applications in coatings due to their deficiency in hydrolytic stability. Although the water dispersibility of a sulfopolyester polymers without EG-based glycols can be retained by increasing the ratio of the sulfonate groups, it is desirable to keep the sulfonate content low in order to obtain adequate water resistance of the coatings. It is, therefore, an object of this invention to prepare sulfopolyester polymers with low sulfonate content, low EG-based glycol content, yet retain good water dispersibility.

The EG-based glycol components may be replaced by diols that are known to be more hydrolytically stable, such as neopentyl glycol (NPG) and cyclohexane dimethanol (CHDM). Sulfopolyester polymers based on such diols, however, are not as water dispersible as those based on EG, DEG, or PEG. A need therefore exists for a diol component that is not EG-based but is capable of providing good water dispersibility. The advantage of such a solution is to either improve the water dispersibility of such a polymer compared to other non-EG-based glycol modified sulfopolyesters having the same quantity of sulfonate groups, or retain an equivalent level of water dispersibility with a lower amount of hydrophilic groups, thereby improving the water resistance of the coating.

3. SUMMARY OF THE INVENTION

This invention relates to a method for the improvement of water dispersibility of sulfopolyester polymers. The improved water dispersibility enables the sulfopolyester polymers to reduce the content of its hydrophilic components and thus provides a solution for certain applications that otherwise are not feasible. The present inventors have unexpectedly discovered that sulfopolyester polymers incorporating 2,2,4,4-tetraalkylclobutanediol (TACD) as one of the diol components exhibit significantly improved water dispersibility over those without TACD.

There is now provided a sulfopolyester polymer comprising 2,2,4,4-tetraalkylcyclobutanediol residues.

There is also provided a sulfopolyester comprising the residues of:
(i) a polyhydroxyl component comprising:
  a. 2,2,4,4-tetraalkylcyclobutanediol (TACD) in an amount ranging from 2 to 60 mole % based on the polyhydroxyl component, and
  b. a polyhydroxyl compound other than TACD; and
(ii) an acid component comprising:
  a. dicarboxylic acid compounds, derivatives of dicarboxylic acid compounds, or combinations thereof; and
  b. a sulfomonomer component having at least one ionic sulfonate group covalently bonded directly or indirectly to an aromatic or cycloaliphatic ring, said ionic sulfonate group having the structure represented by the following formula:

There is also provided an aqueous composition comprising:
A. sulfopolyester present in an amount of 25 to about 35 weight % based on the weight of the aqueous composition, said sulfopolyester containing residues of 2,2,4,4-tetraalkylcyclobutanediol; and
B. water present in an amount of 65 to about 75 weight % based on the weight of the aqueous composition.

There is also provided methods for the manufacture of each. There is also provided methods for coating a substrate with each of the above mentioned polymers and dispersions.

4. DETAILED DESCRIPTION OF THE INVENTION

The mole percentages provided in the present disclosure may be based on the total moles of all monomer residues in the sulfopolyester, or may be based on the total moles of the polyhydroxyl component or the acid component, depending upon the context. For example, a sulfopolyester containing 30 mole % of a sulfomonomer means that the sulfopolyester contains 30 mole % sulfomonomer out of a total of 100 mole % of all monomer residues. Thus, there are 30 moles of sulfomonomer residues among every 100 moles of all monomer residues. However, a sulfopolyester containing 30 mole % of a sulfomonomer, based on the total acid residues, means the sulfopolyester contains 30 mole % sulfomonomer out of a total of 100 mole % only of the acid (ii) residues. Thus, in this latter case, there are 30 moles of sulfomonomer residues among every 100 moles of acid residues.

The term "polyester," as used herein is a polymer that encompasses both "homopolyesters" and "copolyesters." As used herein, the term "sulfopolyester" means any polyester that contains residues of a sulfomonomer.

The term "residue," as used herein, means any organic structure incorporated into the polymer involving the corresponding monomer. Thus, the dicarboxylic acid residue may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

There is now provided a sulfopolyester comprising 2,2,4,4-tetraalkylcyclobutanediol residues.

There is also provided a sulfopolyester comprising the residues of:
(i) a polyhydroxyl component comprising:
  a. 2,2,4,4-tetraalkylcyclobutanediol (TACD) in an amount ranging from 2 to 60 mole % based on the polyhydroxyl component, and
  b. a polyhydroxyl compound other than TACD; and
(ii) an acid component comprising:
  a. dicarboxylic acid compounds, derivatives of dicarboxylic acid compounds, or combinations thereof; and
  b. a sulfomonomer component having at least one ionic sulfonate group covalently bonded directly or indirectly to an aromatic or cycloaliphatic ring, said ionic sulfonate group having the structure represented by the following formula:

The polyhydroxyl component (i) contains compounds, oligomers, and/or polymers having at least two hydroxyl groups and that do not have an ionic sulfonate group. The polyhydroxyl component (i) comprises a) TACD and b) a compound other than TACD.

The composition comprising TACD contains at least a 2,2,4,4-tetraalkylcyclobutane-1,3-diol compound. Such a compound can be represented by the general structure:

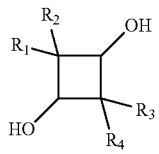

wherein $R_1$, $R_2$, $R_3$, and $R_4$ each independently represent an alkyl radical, for example, a lower alkyl radical having 1 to 8 carbon atoms. The alkyl radicals may be linear, branched, or a combination of linear and branched alkyl radicals.

The method for the manufacture of 2,2,4,4-tetraalkylcyclobutane-1,3-diol is not limited and any conventional or method known at any time can be used. One known method is the hydrogenation reaction of 2,2,4,4-tetraalkylcyclobutane-1,3-dione to produce a 2,2,4,4-tetraalkylcyclobutane-1,3-diol as shown below:

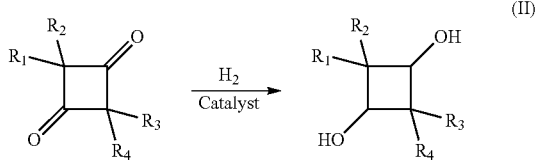

(II)

The 2,2,4,4-tetraalkylcyclobutane-1,3-dione, for example, 2,2,4,4-tetramethylcyclobutane-1,3-dione, is hydrogenated to the corresponding 2,2,4,4-tetraalkylcyclobutane-1,3-diol, for example, 2,2,4,4-tetramethylcyclobutane-1,3-diol.

The alkyl radicals $R_1$, $R_2$, $R_3$, and $R_4$ on the 2,2,4,4-tetraalkylcyclobutane-1,3-dione may each independently have 1 to 8 carbon atoms. 2,2,4,4-tetraalkylcyclobutane-1,3-diones that are suitably reduced to the corresponding diols include, but are not limited to, 2,2,4,4,-tetramethylcyclobutane-1,3-dione, 2,2,4,4-tetraethylcyclobutane-1,3-dione, 2,2,4,4-tetra-n-propylcyclobutane-1,3-dione, 2,2,4,4-tetra-n-butylcyclobutane-1,3-dione, 2,2,4,4-tetra-n-pentylcyclobutane-1,3-dione, 2,2,4,4-tetra-n-hexylcyclobutane-1,3-dione, 2,2,4,4-tetra-n-heptylcyclobutane-1,3-dione, 2,2,4,4-tetra-n-octylcyclobutane-1,3-dione, 2,2-dimethyl-4,4-diethylcyclobutane-1,3-dione, 2-ethyl-2,4,4-trimethylcyclobutane-1,3-dione, 2,4-dimethyl-2,4-diethylcyclobutane-1,3-dione, 2,4-dimethyl-2,4-di-n-propylcyclobutane-1,3-dione, 2,4-n-dibutyl-2,4-diethylcyclobutane-1,3-dione, 2,4-dimethyl-2,4-diisobutylcyclobutane-1,3-dione, and 2,4-diethyl-2,4-diisoamylcyclobutane-1,3-dione.

The corresponding 2,2,4,4-tetraalkylcyclobutane-1,3-diols that may be used as the TACD compound include 2,2,4,4-tetramethylcyclobutane-1,3-diol, 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethylcyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol. Desirably the TACD compound comprises 2,2,4,4-tetramethylcyclobutane-1,3-diol.

The alkyl radicals $R_1$, $R_2$, $R_3$, and $R_4$ on the 2,2,4,4-tetraalkylcyclobutane-1,3-diol may each independently have 1 to 6 carbon atoms, or 1 to 5 carbon atoms, or 1 to 4 carbon atoms, or 1 to 3 carbon atoms, or 1 to 2 carbon atoms. In another embodiment, the alkyl radicals $R_1$, $R_2$, $R_3$, and $R_4$ on the 2,2,4,4-tetraalkylcyclobutane-1,3-diol may each have 1 carbon atom.

The hydrogenation of 2,2,4,4-tetraalkylcyclobutane-1,3-dione typically produces cis-2,2,4,4-tetraalkylcyclobutane-1,3-diol and trans-2,2,4,4-tetraalkylcyclobutane-1,3-diol. The cis/trans molar ratio may range from 1.7 to 0.0 or 1.6 to 0.0 or 1.5 to 0.0 or 1.4 to 0.0 or 1.3 to 0.0 or 1.2 to 0.0 or 1.1 to 0.0 or 1.0 to 0.0 or 0.9 to 0.0 or 0.8 to 0.0 or 0.7 to 0.0 or 0.6 to 0.0 or 0.5 to 0.0 or 0.4 to 0.0 or 0.3 to 0.0 or 0.2 to 0.0 or 0.1 to 0.0. The cis/trans molar ratio may range from 1.7 to 0.1 or 1.6 to 0.1 or 1.5 to 0.1 or 1.4 to 0.1 or 1.3 to 0.1 or 1.2 to 0.1 or 1.1 to 0.1 or 1.0 to 0.1 or 0.9 to 0.1 or 0.8 to 0.1 or 0.7 to 0.1 or 0.6 to 0.1 or 0.5 to 0.1 or 0.4 to 0.1 or 0.3 to 0.1 or 0.2 to 0.1. Or the cis/trans molar ratio may range from 1.7 to 0.2 or 1.6 to 0.2 or 1.5 to 0.2 or 1.4 to 0.2 or 1.3 to 0.2 or 1.2 to 0.2 or 1.1 to 0.2 or 1.0 to 0.2 or 0.9 to 0.2 or 0.8 to 0.2 or 0.7 to 0.2 or 0.6 to 0.2 or 0.5 to 0.2 or 0.4 to 0.2 or 0.3 to 0.2.

As noted above, the process for the manufacture of the 2,2,4,4-tetraalkylcyclobutane-1,3-diol is not limited, and the process for making the 2,2,4,4-tetraalkylcyclobutane-1,3-dione is also not limited. One example of a process for the manufacture of 2,2,4,4-tetramethylcyclobutanediol is from butyric anhydride wherein dimethylketene vapor is absorbed into 2,2,4,4-tetramethylcyclobutane, 1,3-dione which then functions as the process solvent for the conversion (dimerization) of dimethylketene to 2,2,4,4-tetramethylcyclobutanedione followed by hydrogenation of the dione to the diol. Thus, the process for the manufacture of 2,2,4,4-tetramethylcyclobutanediol can include the steps of:

(1) feeding isobutyric anhydride to a pyrolysis zone wherein the isobutyric anhydride is heated at a temperature of about 350 to 600° C. to produce a vapor effluent comprising dimethylketene, isobutyric acid and unreacted isobutyric anhydride;
(2) rapidly cooling the vapor effluent to condense isobutyric acid and isobutyric anhydride and separating the condensate from the dimethylketene vapor;
(3) feeding the dimethylketene vapor to an absorption zone wherein the dimethylketene vapor is contacted with and dissolved in a solvent comprising 2,2,4,4-tetramethylcyclobutane-1,3-dione to produce an effluent comprising a solution of dimethylketene in the solvent;
(4) feeding the absorption zone effluent to a dimerization zone wherein dimethylketene is converted to 2,2,4,4-tetramethylcyclobutane-1,3-dione to produce an effluent consisting essentially of 2,2,4,4-tetramethylcyclobutanedione; and
(5) feeding the dimerization zone effluent to a hydrogenation zone wherein the effluent is contacted with a supported hydrogenation catalyst under hydrogenation conditions of pressure and temperature to produce an effluent consisting essentially of 2,2,4,4-tetramethylcyclobutanediol.

The first step of the process involves feeding isobutyric anhydride, usually in combination with an inert gas such as nitrogen, to the pyrolysis zone wherein the isobutyric anhydride is heated at about 350 to 600° C. under reduced pressure, e.g., 20 to 500 torr. Preferred conditions are temperatures in the range of 400 to 500° C. and pressures of 40 to 250 torr. The contact or residence time of the reactant and product within the pyrolysis zone typically is in the range of about 0.1 to 8 seconds, depending on the temperatures and pressures employed. Step (1) preferably is carried out to achieve an average butyric anhydride conversion of at least 30%, preferably about 50 to 90%.

The second step of the process comprises rapidly cooling the pyrolysis effluent to condense the isobutyric acid by product of the pyrolysis reaction and unreacted butyric anhydride and separating the condensed liquids from the dimethylketene vapor to minimize the reaction of the isobutyric acid and dimethyl ketene. Cooling of the vapor stream may be accomplished using conventional equipment such as one or more heat exchangers or externally cooled cyclones which provide efficient heat removal. The cooling required by the second step normally should reduce the temperature of the pyrolysis effluent to at least 40° C., preferably about 20 to 30° C. The condensed isobutyric acid and isobutyric anhydride may be separated from the gaseous dimethylketene by conventional gas liquid separation means such as one or more cyclones. When the pyrolysis step is carried out under reduced pressure, the temperature reduction and separation of the second step normally are performed at pressures substantially the same as those existing within the pyrolysis zone.

In the third step, the highly volatile dimethylketene vapor from the second step is drawn through the vacuum pump(s) and fed to the absorption zone wherein it is contacted with and dissolved in an inert solvent comprising liquid (melted) 2,2,4,4-tetramethylcyclobutane-1,3-dione. The vacuum pump(s) used to reduce the pressure of the pyrolysis or cracking and the cooling separation zones preferably is of a type which does not require a liquid seal. The absorption zone typically is operated at a temperature of about 100 to 150° C., preferably about 115 to 120° C., and a pressure of about 1 to 3 atmospheres absolute to keep the dione extractant in the liquid phase. Essentially all of the dimethylketene absorbed by the dione dimerizes to the dione. Increasing the pressure within the absorption zone generally will result in increased absorption of the dimethylketene.

The absorption zone comprises apparatus which provides for intimate contact between the dimethylketene vapor and the liquid solvent. For example, the apparatus may consist of one or more columns equipped with packing material or trays wherein the dimethylketene vapor is fed at or near the bottom of the column and the solvent is fed at or near the top of the column resulting in the dissolution of the ascending gas by the descending liquid solvent. The flow rate of the dione through the absorber preferably gives a 4% solution of dimethylketene.

The dimerization zone of the fourth step may comprise any apparatus which permits the step (3) effluent to be maintained at a temperature of about 120 to 140° C. for a period of time, e.g., a residence time of about 50 to 80 minutes, sufficient to convert substantially all of the dimethylketene in the effluent to 2,2,4,4-tetramethylcyclobutanedione. Thus, the dimerization zone may consist of an agitated vessel equipped with means to heat the step (3) effluent. The product effluent of the dimerization zone consists essentially of 2,2,4,4-tetramethylcyclobutanedione. A portion of the product dione equivalent to the amount of dimethylketene fed to the absorption zone is fed to the hydrogenation zone. The remaining dione is recirculated to the absorption zone.

The final step comprises the hydrogenation of the 2,2,4,4-tetramethylcyclobutanedione present in the step (4) effluent wherein the effluent is contacted with hydrogen at hydrogenation conditions of pressure and temperature in the presence of a hydrogenation catalyst, i.e., a catalyst which is effective to promote the hydrogenation of carbonyl compounds to their corresponding alcohols such as, but not limited to, Raney nickel, Raney cobalt molybdenum promoted nickel, copper chromite and supported Group VIII metals. The hydrogenation preferably is carried out in the presence of a supported catalyst such as nickel on alumina, nickel on silica, ruthenium on carbon or alumina, platinum on alumina and platinum on carbon. The supported nickel 65 catalyst is especially preferred. The hydrogenation conditions may be selected from temperatures and pressures in the range of about 100 to 2000 psig and 130 to 200° C. The conditions preferably are in the range of about 300 to 400 psig and 130 to 180° C.

The 2,2,4,4-tetramethylcyclobutanediol obtained from the hydrogenation step in accordance with the process described hereinabove may be isolated by means of conventional distillation and or crystallization procedures. If necessary, the product diol may be distilled, optionally under reduced pressure, to obtain substantially pure 2,2,4,4-tetramethylcyclobutanediol.

Dimethylketene can be made by contacting, for greater than 1 second, isobutyric anhydride at a temperature of about 350 to 450° C. and a pressure of less than 500 torr. In addition to lowering operating costs, the use of a lower temperature results in the formation of less decomposition products, thereby increasing the yield of dimethylketene based on the isobutyric anhydride converted. This embodiment of our invention preferably employs a contact time of about 0.01 to 10 seconds at 350 to 450° C. and a pressure of about 50 to 250 torr.

The composition comprising TACD compounds may have TACD present in an amount, by weight, of at least 15%, or at least 30%, or at least 40%, or at least 50%, or at least 60%, or at least 70%, or at least 80%, or at least 90%, or at least 95%, or at least 97%, or at least 98%, or at least 99%, based on the weight of the TACD composition, which are all ingredients in the TACD composition before combining with the polyhydroxyl component (i)(b), or the diacid component (ii), or the sulfomonomer (iii).

The TACD composition replaces a portion of the conventional polyhydroxyl compounds (i)(b) used to make sulfopolyesters. By using TACD as part of the polyhydroxyl component, the water dispersibility of the sulfopolyester is improved relative to the same sulfopolyester without the TACD compound(s). This has the advantage of providing flexibility to employ a sulfopolyester providing greater water dispersibility, or lowering the quantity of sulfomonomer in the sulfopolyester to provide an equivalent level of water dispersibility while improving the water resistance of the cured coating containing the sulfopolyester. For example, sulfopolyesters can be made without ethylene glycol or other hydrophilic groups, but such sulfopolyesters require a high quantity of sulfomonomer to retain water dispersibility, which has the attendant disadvantage of degrading the water resistance of the coating. By the use of TACD, one may now obtain good water dispersibility while also obtaining good water resistance by avoiding the necessity to increase the sulfomonomer content.

It was surprising to find that a TACD compound improved the water dispersibility of the sulfopolyester. For example, ethylene glycol is hydrophilic and has a given oxygen:carbon ratio. The oxygen:carbon ratio of TACD is lower than that of ethylene glycol and so one would expect, on that basis, that TACD would not provide a level of water dispersibility similar to ethylene glycol. It is unclear why TACD provides this benefit. Further, the use of ethylene glycol as the sole polyhydroxyl monomer, while rendering the sulfopolyester water dispersible, also increases its sensitivity to hydrolysis due to the hydrophilic nature of ethylene glycol. Thus, by replacing a portion of the ethylene glycol monomers with TACD as a co-monomer, the amount of sulfopolyester monomer can be maintained to obtain equivalent levels of water dispersibility while thereby improving the resistance of the coating against hydrolysis.

The amount of TACD monomer residues used is sufficient to provide for an amount present in the sulfopolyester of at least 2 mole %, based on the moles of the polyhydroxyl component residues. For example, the amount of TACD compounds can be at least 4 mole %, or at least 5 mole %, or at least 7 mole %, or at least 10 mole %, or at least 15 mole %, or at least 20 mole %, or at least 25 mole %, or at least 30 mole %, or at least 35 mole %, or at least 40 mole %, or at least 45 mole %, based on the moles of the polyhydroxyl component. The amount of TACD compounds in the upper end of the range is not particularly limited, but practically does not need to exceed 60 mole %, or does not exceed 57 mole %, or does not exceed 55 mole %, or does not exceed 53 mole %, or does not exceed 50 mole %, or does not exceed 45 mole %, or does not exceed 40 mole %, or does not exceed 35 mole %, or does not exceed 30 mole %, based on the moles of the polyhydroxyl component.

The amount of residues of TACD present in the sulfopolyester, based on the moles of all residues in the sulfopolyester, is at least 1 mole %, or at least 2 mole %, or at least 2.5 mole %, or at least 3.5 mole %, or at least 5 mole %, or at least 7.5 mole %, or at least 10 mole %, or at least 12.5 mole %, or at least 15 mole %, or at least 17.5 mole %, or at least 20 mole %, or at least 22.5 mole %. The amount of TACD compounds in the upper end of the range is not particularly limited, but practically does not need to exceed 30 mole %, or does not exceed 27.5 mole %, or does not exceed 26 mole %, or does not exceed 25 mole %, or does not exceed 22.5 mole %, or does not exceed 20 mole %, or does not exceed 17.5 mole %, or does not exceed 15 mole %, based on the moles of all residues in the sulfopolyester.

Examples of ranges of the amount of TACD residue present in the residues of the polyhydroxy component include 2-60 mole %, or 5-60 mole %, or 10-60 mole % or 15-60 mole % or 20-60 mole % or 25-60 mole % or 30-60 mole % or 2-55 mole %, or 5-55 mole %, or 10-55 mole %, or 15-55 mole %, or 20-55 mole %, or 25-55 mole %, or 30-55 mole %, or 2-50 mole %, or 5-50 mole %, or 10-50 mole %, or 15-50 mole %, or 20-50 mole %, or 25-50 mole %, or 30-50 mole %, or 2-45 mole %, or 5-45 mole %, or 10-45 mole %, or 15-45 mole %, or 20-45 mole %, or 25-45 mole %, or 30-45 mole %, or 2-40 mole %, or 5-40 mole %, or 10-40 mole %, or 15-40 mole %, or 20-40 mole %, or 25-40 mole %, or 30-40 mole %. Suitable ranges based on the moles of all residues in the sulfopolyester are each of the values of these numeric ranges divided in half.

Suitable (i)(b) polyhydroxyl compounds, other than TACD, include compounds that have at least two hydroxyl groups, do not have an ionic sulfonate group, and are compounds other than TACD. Examples of such compounds include 2,2-dimethyl-1,3-propanediol (neopentyl glycol or NPG), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, hydrogenated bisphenol A, ethylene glycol, propylene glycol, diethylene glycol, dipropylene glycol, triethylene glycol, tetraethylene glycol, polyethylene glycol, 1,1,1-trimethylol propane, 1,1,1-trimethylolethane, glycerin, pentaerythritol, erythritol, threitol, dipentaerythritol, sorbitol, and the like.

The content of polyhydroxyl compounds (I)(b), other than the TACD composition (i)(a), residues present in the sulfopolyester, based on the total moles of the polyhydroxyl component (i), is at least 40 mole %, or at least 45 mole %, or at least 50 mole %, or at least 55 mole %, or at least 60 mole %, or at least 65 mole %, or at least 70 mole %, or at least 75 mole %, or at least 80 mole %, or at least 85 mole %, and up to 98 mole %, or up to 96 mole %, or up to 95 mole %, or up to 93 mole %, or up to 90 mole %, or up to 85 mole %, or up to 80 mole %, or up to 75 mole %, or up to 70 mole %, or up to 65 mole %, or up to 60 mole %, or up to 55 mole %, in each case based on the total moles of the polyhydroxyl component (i). For example, ranges can include, but are not limited to, 40 mole % to 98 mole %, or 45 mole % to 98 mole %, or 50 mole % to 98 mole %, or 55 mole % to 98 mole %, or 60 mole % to 98 mole %, or 65 mole % to 98 mole %, or 70 mole % to 98 mole %, or 40 mole % to 95 mole %, or 40 mole % to 90 mole %, or 40 mole % to 85 mole %, or 40 mole % to 80 mole %, or 40 mole % to 75 mole %, or 40 mole % to 70 mole %, or 40 mole % to 65 mole %, or 40 mole % to 60 mole %, or 45 mole % to 95 mole %, or 45 mole % to 90 mole %, or 45 mole % to 85 mole %, or 45 mole % to 80 mole %, or 50 mole % to 95 mole %, or 50 mole % to 90 mole %, or 50 mole % to 85 mole %, or 50 mole % to 80 mole %.

Preferably, the polyhydroxyl component (i)(b) includes 2,2-dimethyl-1,3-propanediol (neopentyl glycol or NPG), 1,3-cyclohexanedimethanol, 1,4-cyclohexanedimethanol (CHDM), 2,2,4-trimethyl-1,3-pentanediol, hydroxypivalyl hydroxypivalate, 2-butyl-2-ethyl-1,3-propanediol, 2-methyl-1,3-propanediol, trimethylol propane, or a mixture thereof. In one example, the polyhydroxyl component comprises (a)

TACD and (b) either NPG, CHDM, and optionally ethylene glycol, or a combination thereof.

While ethylene glycol, propylene glycol, diethylene glycol, dipropylene glycol, triethylene glycol, tetraethylene glycol, polyethylene glycol, and the like may be used as a polyhydroxyl component, they are preferably used in minor amounts, if at all. Thus, the sulfopolyester polymer may contain no more than 50 mole %, or no more than 40 mole %, or no more than 30 mole %, or no more than 20 mole %, or no more than 15 mole %, or no more than 10 mole %, or no more than 5 mole %, or no more than 3 mole % of the residues of a polyhydroxyl compound, based on the total moles of polyhydroxyl compounds, having one unit or repeating units represented by the structure:

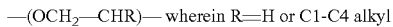
—(OCH$_2$—CHR)— wherein R=H or C1-C4 alkyl

The sulfopolyester may also include, if desired, from greater than 0 to about 25 mole %, based on the total moles of all the monomers, of a branching monomer having 3 or more functional groups wherein the functional groups are hydroxyl, carboxyl, or a combination thereof. Non-limiting examples of branching monomers are 1,1,1-trimethylol propane, 1,1,1-trimethylolethane, glycerin, pentaerythritol, erythritol, threitol, dipentaerythritol, sorbitol, trimellitic anhydride, pyromellitic dianhydride, dimethylol propionic acid, or combinations thereof. Further examples of branching monomer concentration ranges are from more than 0 to about 20 mole % and from more than 0 to about 10 mole %. The presence of a branching monomer may result in a number of possible benefits to the sulfopolyester of the present invention, including but not limited to, the ability to tailor rheological, solubility, and tensile properties. For example, at a constant molecular weight, a branched sulfopolyester, compared to a linear analog, will also have a greater concentration of end groups that may facilitate post-polymerization crosslinking reactions. At high concentrations of a branching agent, however, the sulfopolyester may be prone to gelation during its synthesis. Suitable crosslinkers for crosslinking with either the linear or the branched sulfopolyester of the present invention include, but are not limited to, urea/formaldehyde type, melamine/formaldehyde type, and isocyanate type crosslinking agents, each as known in the art. Urea/formaldehyde type and melamine/formaldehyde type crosslinking agents have a plurality of —N(CH$_2$OR)$_2$ functional groups, wherein R is a C$_1$-C$_4$ alkyl group, preferably, a methyl group. Examples of suitable crosslinking agents include, but are not limited to, 1,6-hexamethylene diisocyanate, methylene bis(4-cyclohexyl isocyanate), isophorone diisocyanate, 2,4-toluene diisocyanate, Bayhydur® hydrophilic polyisocyanates (BAYER), hexamethoxymethylmelamine, tetramethoxymethylbenzoquanamine, tetramethoxymethylurea, and mixed butoxy/methoxy substituted melamines or ureas.

The sulfopolyester may contain less than 5 mole %, or less than 3 mole %, or less than 2 mole %, or less than 1 mole %, or less than 0.5 mole % of the residues of the branching monomer having 3 or more functional groups, based on the total moles of all the monomers.

The sulfopolyester is also made from an (ii) acid component. The acid component includes a (ii)(a) dicarboxylic acid compound and (ii)(b) a sulfomonomer.

The dicarboxylic acid compound (II)(a) is a compound having at least two carboxylic acid groups, derivatives thereof, or combinations thereof, capable of forming an ester linkage with a polyhydroxyl component. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride.

Examples of dicarboxylic acids that may be used include aliphatic dicarboxylic acids, alicyclic dicarboxylic acids, aromatic dicarboxylic acids, derivatives of each, or mixtures of two or more of these acids. Thus, suitable dicarboxylic acids include, but are not limited to, isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, hexahydrophthalic anhydride, tetrahydrophthalic anhydride, tetrachlorophthalic anhydride, dodecanedioic acid, sebacic acid, azelaic acid, maleic acid or anhydride, fumaric acid, succinic anhydride, succinic acid, adipic acid, 2,6-naphthalenedicarboxylic acid, glutaric acid, itatonic acid, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyldibenzoic acid, and their derivatives, and mixtures thereof.

Desirably, the dicarboxylic acid compound is isophthalic acid (or dimethyl isophthalate), terephthalic acid (or dimethyl terephthalate), phthalic acid, phthalic anhydride, adipic acid, 1,4-cyclohexanedicarboxylic acid, 1,3-cyclohexanedicarboxylic acid, hexahydrophthalic anhydride, 2,6-naphthalenedicarboxylic acid (or dimethyl 2,6-naphthalenedicarboxylate), or a mixture thereof.

The dicarboxylic acid component desirably includes isophthalic acid (or dimethyl isophthalate), terephthalic acid (or dimethyl terephthalate), or a mixture thereof.

During the sulfopolyester synthesis, TACD tends to be prone to decompose in the presence of a large amount of a diacid such as IPA and/or TPA. This problem can be eliminated by replacing one or all of the carboxylic acid functional groups with the dimethyl ester of the diacid such as dimethyl isophthalate (DMI) or dimethyl terephthalate (DMT). Thus, for polycondensation reaction at high temperatures, DMI and DMT can be used as the dicarboxylic acid compounds (II)(a) instead of IPA and TPA, or as the ingredients present in amounts of more than 50 mole % based on the moles of the dicarboxylic acid compounds (II)(b).

Although the dicarboxylic acid methyl esters have been mentioned, it is also acceptable to include higher order alkyl esters, such as ethyl, propyl, isopropyl, butyl, and so forth. In addition, aromatic esters, particularly phenyl, also may be employed.

In addition to the dicarboxylic acid, the monofunctional or polyfunctional carboxylic acids (3 or more carboxylic acid groups) can be used. A tricarboxylic acid may be, for example, trimellitic anhydride. A monofunctional acid may be, for example, benzoic acid, t-butylbenzoic acid, acetic acid, propionic acid, butanoic acid, hexanoic acid, versatic acid, octanoic acid, or other C2-C20 acids, or unsaturated fatty acids such as tallow acid, linoleic acid, linolenic acid, oleic acid, soya acid, linseed acid, crotonic acid, tall oil fatty acid, rosin acid, and mixtures thereof.

The sulfopolyester contains dicarboxylic acid compound (and/or derivatives) residues present in an amount of at least 80 mole %, or at least 85 mole %, or at least 90 mole %, or at least 92 mole %, or at least 94 mole %, or at least 95 mole %, or at least 96 mole %, or up to 97 mole %, or up to 95 mole %, or up to 93 mole %, or up to 91 mole %, or up to 85 mole %, based on the total moles of the acid component.

The sulfopolyester is also obtained by reacting a (ii)(b) sulfomonomer with the polyhydroxyl component and/or the dicarboxylic acids (and/or derivatives) compounds. The sulfomonomer may contain at least one carboxylic acid group, and contains at least one —SO$_3^-$ group, and may optionally also contain hydroxyl groups. A monofunctional sulfomonomer contains one carboxylic acid group or derivative thereof. A difunctional sulfomonomer contains two carboxylic acid groups (or derivatives thereof), or a combination of a hydroxyl group and a carboxylic acid group (or derivative thereof). Optionally, the sulfomonomer may be pre-reacted as discussed below.

The sulfomonomer contains a —SO$_3^-$ sulfonate group. This group may be in the form of a salt such that the sulfomonomer may contain an —SO$_3$M group attached to an aromatic or cycloaliphatic nucleus wherein M is the cation of the sulfonate salt. M may be hydrogen or an alkali metal ion, an alkaline earth metal ion, or a transition metal ion. Examples of suitable metal cations include Na$^+$, Li$^+$, K$^+$, Ca$^{++}$, Mg$^{++}$, Ni$^{++}$, Cu$^{++}$, Fe$^{++}$, or Fe$^{+++}$ and the like. Alternatively, the cation of the sulfonate salt may be non-metallic such as a nitrogenous base as described, for example, in U.S. Pat. No. 4,304,901. Nitrogen-based cations are derived from nitrogen-containing bases, which may be aliphatic, cycloaliphatic, or aromatic compounds. Examples of such nitrogen containing bases include ammonia, dimethylethanolamine, diethanolamine, triethanolamine, pyridine, morpholine, and piperidine. Because monomers containing the nitrogen-based sulfonate salts typically are not thermally stable at conditions required to make the polymers in the melt, a useful method for preparing sulfopolyesters containing nitrogen-based sulfonate salt groups is to disperse, dissipate, or dissolve the polymer containing the required amount of sulfonate group in the form of its alkali metal salt in water and then exchange the alkali metal cation for a nitrogen-based cation.

When a monovalent alkali metal ion is used as the cation of the sulfonate salt, the resulting sulfopolyester is completely dispersible in water with the rate of dispersion dependent on the content of sulfomonomer in the polymer, temperature of the water, surface area/thickness of the sulfopolyester, and so forth. When a divalent metal ion is used, the resulting sulfopolyesters are not readily dispersed by cold water but are more easily dispersed by hot water. Utilization of more than one counterion within a single polymer composition is possible and may offer a means to tailor or fine-tune the water-responsivity of the resulting article of manufacture. Examples of sulfomonomer residues include monomer residues where the sulfonate salt group is attached to an aromatic acid nucleus, such as, for example, benzene; naphthalene; diphenyl; oxydiphenyl; sulfonyldiphenyl; and methylenediphenyl or cycloaliphatic rings, such as, for example, cyclohexyl; cyclopentyl; cyclobutyl; cycloheptyl; and cyclooctyl. Other examples of sulfomonomer residues which may be used in the present invention are the metal sulfonate salt of sulfophthalic acid, sulfoterephthalic acid, sulfoisophthalic acid, or combinations thereof. Other examples of sulfomonomers which may be used are 5-sodiosulfoisophthalic acid and esters thereof.

The sulfomonomers may be prepared using methods well known in the art. For example, sulfomonomers in which the sulfonate group is attached to an aromatic ring may be prepared by sulfonating the aromatic compound with oleum to obtain the corresponding sulfonic acid and followed by reaction with a metal oxide or base, for example, sodium acetate, to prepare the sulfonate salt. Procedures for preparation of various sulfomonomers are described, for example, in U.S. Pat. Nos. 3,779,993; 3,018,272; and 3,528,947, the preparation procedures of which are incorporated herein by reference.

It is also possible to prepare the polyester using, for example, a sodium sulfonate salt, and ion-exchange methods to replace the sodium with a different ion, such as zinc, when the polymer is in the dispersed form. This type of ion exchange procedure is generally superior to preparing the polymer with divalent salts insofar as the sodium salts are usually more soluble in the polymer reactant melt-phase.

Examples of the aromatic or cycloaliphatic nucleus to which the —SO$_3^-$ group may be attached include, but are not limited to, benzene, naphthalene, anthracene, diphenyl, oxydiphenyl, sulfonyl-diphenyl, methylenediphenyl, and the like.

Desirable sulfomonomers comprise the metal salts, such as sodium or lithium or potassium salts, of sulfoisophthalic acid, a sulfoterephthalic acid, a sulfophthalic acid, a 4-sulfo-naphthalene-2,7-dicarboxylic acid, or derivatives thereof. More specific examples of desirable sulfomonomers include is 5-sodiosulfoisophthalic acid or a derivative such as dimethyl 5-sodiosulfoisophthalate. Other monomers include lithium 5-sulfoisophthalic acid, dimethyl lithium 5-sulfoisophthalate, potassium 5-sulfoisophthalic acid, and dimethyl potassium 5-sulfoisophthalate.

Other examples of sulfomonomers include those represented by the following formulas:

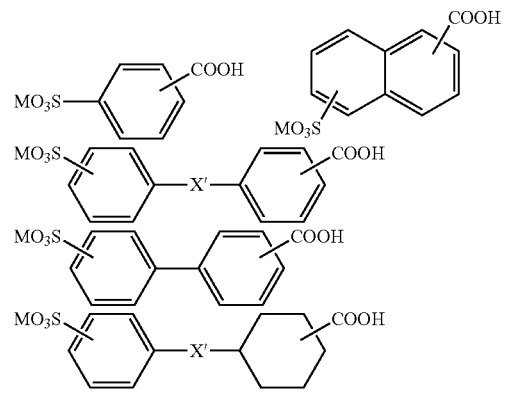

where X' is CH$_2$, SO$_2$, or O and M is defined above.

Additional examples of such sulfomonomers are disclosed in U.S. Pat. No. 3,734,874, and those monomers are incorporated herein by reference.

Optionally, the sulfomonomer containing at least one ionic sulfonate group may be pre-reacted with a polyol to produce a polyol (e.g. a diol) sulfomonomer adduct for subsequent sulfopolyester polymers synthesis. For example, a monofunctional sulfomonomer may be pre-reacted with a polyol containing at least three hydroxyl groups. If pre-reacted, the carboxylic acid groups on the sulfomonomer may be completely reacted with a polyol or may be only partially reacted or a combination thereof to have a distribution of partially and completely reacted sulfomonomer compounds.

Examples of polyols that may be pre-reacted with a monofunctional sulfomonomer include trimethylolpropane, trimethylolethane, glycerol, pentaerythritol, and erythritol. When the polyol sulfomonomer adduct is prepared by reacting a difunctional sulfomonomer with a polyol, the polyol is preferably a diol. Suitable examples of diols include 2,2-dimethyl-1,3-propanediol (neopentyl glycol), 1,3-cyclohexanedimethanol, 1,4-cyclohexanedimethanol, 2,2,4-trimethyl-1,3-pentanediol, 2-butyl-2-ethyl-1,3-propanediol, hydroxypivalyl hydroxypivalate, 2-methyl-1,3-propanediol, 1,4-butanediol, and 1,6-hexanediol.

The amount of sulfomonomer used to make the sulfopolyester, or the quantity of sulfomonomer residues present in the sulfopolyester, may be an amount of at least 3 mole %, or at least 5 mole %, or at least 7 mole %, or at least 8 mole %, or at least 9 mole %, or up to 20 mole %, or up to 15 mole %, or up to 12 mole %, or up to 10 mole %, or up to 8 mole %, or up to 6 mole %, or up to 5 mole %, based on the total moles of the acid component.

The sulfopolyester may be the reaction product of any of the ingredients in any of the quantities mentioned above.

The sulfopolyester may also be the reaction product of:
(i) a polyhydroxyl component comprising:
  a. 2,2,4,4-tetraalkylcyclobutanediol (TACD) in an amount ranging from 2 mole % to 60 mole %, or 10 mole % to 50 mole %, based on the moles of the polyhydroxyl component, and
  b. a polyhydroxyl compound comprising neopentyl glycol, 1,4-cyclohexanedimethanol (CHDM), or a mixture thereof, in a cumulative amount ranging from 40 mole % to 98 mole %, or 50 mole % to 90 mole %, based on the moles of the polyhydroxyl component; and
(ii) an acid component comprising:
  a. dicarboxylic acid compound comprising isophthalic acid (or dimethyl isophthalate or other derivatives), terephthalic acid (or dimethyl terephthalate or other derivatives), or a mixture thereof, in a cumulative amount from 85 mole % to 95 mole %, or 87 mole % to 91 mole %, based on the moles of the acid component, and
  b. a sulfomonomer in an amount ranging from 5 mole % to 15 mole %, or 9 mole % to 13 mole %, based on the moles of the acid component.

The sulfopolyester may have an acid number less than about 30 mg KOH/g and a number average weight of about 800 to about 15,000 g/mole. The sulfopolyester may have an inherent viscosity, abbreviated hereinafter as "Ih.V.," of at least about 0.1 dL/g, preferably about 0.2 to 0.3 dL/g, and most preferably greater than about 0.3 dL/g, measured in a 60/40 parts by weight solution of phenol/tetrachloroethane solvent at 25° C. and at a concentration of about 0.5 g of sulfopolyester in 100 mL of solvent.

There is also provided a sulfopolyester comprising residues of TACD, or preferably TMCD, present in an amount of 2 mole % to 60 mole %, based on the moles of TACD and all polyhydroxyl compounds other than TACD.

The sulfopolyesters of the instant invention are readily prepared from the appropriate dicarboxylic acids, esters, anhydrides, or salts, sulfomonomer, and the appropriate mixtures of polyhydroxyl component using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation and is to be contrasted with a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the sulfopolyester may deteriorate in appearance if allowed to reside in a reactor at an elevated temperature for too long a duration.

The sulfomonomer is most often added directly to the reaction mixture from which the polymer is made, although other processes are known and may also be employed, for example, as described in U.S. Pat. Nos. 3,018,272, 3,075,952, and 3,033,822. The reaction of the sulfomonomer, polyhydroxyl component, and remaining ingredients in the acid component may be carried out using conventional polyester polymerization conditions. For example, when preparing the sulfopolyesters by means of an ester interchange reaction, i.e., from the ester form of the dicarboxylic acid compounds, the reaction process may comprise two steps. In the first step, the polyhydroxyl component including the TACD and other polyhydroxyl compounds, and the acid component, including the sulfomonomer and the dicarboxylic acid compounds such as, for example, dimethyl isophthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form sulfopolyester with the elimination of diol, which is readily volatilized under these conditions and removed from the system. This second step, or polycondensation step, is continued under higher vacuum and a temperature which generally ranges from about 230° C. to about 350° C., preferably about 250° C. to about 310° C. and most preferably about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reactions of both stages are facilitated by appropriate catalysts such as, for example, alkoxy titanium compounds, alkali metal hydroxides and alcoholates, salts of organic carboxylic acids, alkyl tin compounds, metal oxides, and the like. Preferably, the catalyst is an organometallic acid catalyst, such as, for a carboxylate of tin, e.g. butylstannoic acid. The amount of the catalyst added may be determined by routine experimentation as understood by those skilled in the art. Preferably, a catalyst is added in amounts ranging from about 0.01 to 1.0 weight percent, based on the total weight of the reactants. A three-stage manufacturing procedure, similar to that described in U.S. Pat. No. 5,290,631, may also be used, particularly when a mixed monomer feed of acids and esters is employed.

To ensure that the reaction of the polyhydroxyl component and acid component by an ester interchange reaction mechanism is driven to completion, it is preferred to employ about 1.05 to about 2.5 moles of polyhydroxyl component to one mole acid component. Persons of skill in the art will understand, however, that the ratio of polyhydroxyl component to acid component is generally determined by the design of the reactor in which the reaction process occurs.

In the preparation of sulfopolyester by direct esterification, i.e., from the acid form of the dicarboxylic acid component, sulfopolyesters are produced by reacting the acid component with the polyhydroxyl component The reaction is conducted at a pressure of from about 7 kPa gauge (1 psig) to about 1379 kPa gauge (200 psig), preferably less than 689 kPa (100 psig) to produce a low molecular weight, linear or branched sulfopolyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

The sulfopolyester may have any glass transition temperature, abbreviated herein as "Tg." In one embodiment, the sulfopolyester has a Tg of at least 25° C. as measured on the dry polymer using standard techniques, such as differential scanning calorimetry ("DSC"), well known to persons skilled in the art. The Tg measurements of the sulfopolyesters are conducted using a "dry polymer," that is, a polymer sample in which adventitious or absorbed water is driven off by heating to polymer to a temperature of about 200° C. and allowing the sample to return to room temperature. Typically, the sulfopolyester is dried in the DSC apparatus by conducting a first thermal scan in which the sample is heated to a temperature above the water vaporization temperature, holding the sample at that temperature until the vaporization of the water absorbed in the polymer is complete (as indicated by an a large, broad endotherm), cooling the sample to room temperature, and then conducting a second thermal scan to obtain the Tg measurement. Further examples of glass transition temperatures that can be exhibited by the sulfopolyester are at least 30° C., at least 35° C., at least 40° C., at least 50° C., at least 60° C., at least 65° C., at least 80° C., and at least 90° C. Although other Tg's are possible, typical glass transition temperatures of the dry sulfopolyesters are about 30° C., about 48° C., about 55° C., about 65° C., about 70° C., about 75° C., about 85° C., about 90° C., about 100° C., and about 110° C.

Aqueous dispersions of the sulfopolyesters of the present invention are typically prepared by dispersing the resins with water in the presence of 5% organic co-solvent(s), based on the weight of the sulfopolyester polymers, at a temperature ranging from about 60 to about 95° C. under ambient pressure. The dispersing process may be carried out either by gradually adding the resin to the heated mixture of water and the co-solvent(s) or by gradually adding water to the heated mixture of the resin and the co-solvent(s). The former method is preferred for resins with a high Tg (e.g. >60° C.), which can be pulverized, for example, by using a blender and subsequently added to the heated water. For resins with a lower Tg, it is preferred to add water to the heated resin mixture. After the completion of adding either resin or water, the stirring is allowed to continue until a homogeneous dispersion is obtained. The process typically takes several hours. It is intended for this terminology to include conditions where the sulfopolyester is dissolved to form a true solution as well as those where the sulfopolyester is dispersed within the aqueous medium. Often, due to the statistical nature of sulfopolyester compositions, it is possible to have a soluble fraction and a dispersed fraction when a single sulfopolyester sample is placed in an aqueous medium.

There is also provided a sulfopolyester comprising residues of TACD, and preferably TMCD, present in an amount of 2 mole % to 60 mole %, based on the moles of TACD and all polyhydroxyl compounds other than TACD, wherein the sulfopolyester is substantially not water dispersible in the absence of TACD. Aqueous dispersions of sulfopolyester polymers are typically prepared at an elevated temperature under ambient pressure. Since the presence of solid particles in coating formulations can cause coating defects and render such products not commercially viable, it is important that the aqueous dispersions obtained are substantially free of solid particulate substances. Water dispersibility of the sulfopolyester polymers may be improved by using an organic co-solvent to help disperse the resins; however, the use of an extensive amount of organic solvents in a waterborne formulation would defeat the purpose of being an environmentally friendly water-based product and thus is not desirable. Water dispersibility is defined as the ability of a sulfopolyester to form an aqueous dispersion at ambient pressure that is substantially free of undispersed solid particulate substances in the presence of one or more organic co-solvents present in an amount of no more than about 10%, based on the weight of the sulfopolyester. Thus, a sulfopolyester polymers is considered not water dispersible if a significant amount of the resin remains un-dispersed after the completion of the dispersing process specified in this invention. The presence of traces (for example, less than about 1 wt % based on the weight of the dispersion) of undispersed solid residues in the dispersion after the dispersing process is considered acceptable since the solids can be readily removed by filtration. Depending on the amount of water used to obtain an adequate viscosity of the dispersion, the final percent solids that are dispersed may vary from about 25 to about 35%.

Thus, there is also provided a sulfopolyester in which the sulfopolyester is water dispersible, and wherein the sulfopolyester is not water dispersible if all the TACD residues are replaced with polyhydroxyl compounds other than those having one unit or repeating units represented by the structure:

—(OCH$_2$—CHR)— wherein R=H or C1-C4 alkyl

An advantage of the invention is that sulfopolyesters otherwise not water dispersible, due to the percentage of or types of other monomer residues present in the sulfopolyester, can now be made water dispersible by use of TACD. To determine whether the sulfopolyester would not be water dispersible, the same synthetic process and recipe is used as a comparison except that the amount of TACD used is replaced with any polyhydroxyl compound, other than those having one unit or repeating units represented by the structure —(OCH$_2$—CHR)—, wherein R=H or C1-C4 alkyl and then tested for water dispersibility. In this embodiment, one may take advantage of the ability of TACD to provide the desired water dispersibility to an otherwise non-water dispersible sulfopolyester.

There is also provided an aqueous dispersion comprising
A. a sulfopolyester present in an amount of 25 to about 35 weight % based on the weight of the aqueous composition, said sulfopolyester containing residues of 2,2,4,4-tetraalkylcyclobutanediol; and
B. water present in an amount of 65 to about 75 weight % based on the weight of the aqueous composition.

An organic co-solvent is optional but if present is within a range of greater than zero up to 10 wt %, or up to 20 wt %, or up to 30 wt % based on the weight of the dispersion. Desirably, the dispersion contains no more than 1 wt % undispersed solids before filtering the dispersion.

Suitable organic co-solvents that can be used in combination with water are water-miscible co-solvents. Examples of such water-miscible co-solvents include alcohols, ketones, glycol ethers, esters and the like. Desirably, the co-solvents include low molecular weight alcohols such as C1 to C8 alcohols, for example, ethanol, n-propanol, isopropanol, n-butanol, 2-butanol, isobutanol. Also preferred are ethylene glycol monobutyl ether, ethylene glycol monoethyl ether, propylene glycol monbutyl ether, propylene glycol monoethyl ether, propylene glycol monopropyl ether, diethylene glycol monomethyl ether, diethylene glycol monopropyl ether, dipropylene glycol monomethyl ether, diethylene glycol monoethyl acetate, and the like; ethyl acetate, isobutyl acetate, n-butyl acetate, and the like; acetone, methyl ethyl ketone, methyl propyl ketone, and the like.

If desired, the sulfopolyesters may be blended with one or more supplemental polymers depending upon the desired properties in the ultimate application. The supplemental polymer may or may not be water-dispersible depending on the application and may be miscible or immiscible with the sulfopolyester. If the supplemental polymer is water non-dispersible, it is preferred that the blend with the sulfopolyester is immiscible. The term "miscible," as used herein, is intended to mean that the blend has a single, homogeneous amorphous phase as indicated by a single composition-dependent Tg. For example, a first polymer that is miscible with second polymer may be used to "plasticize" the second polymer as illustrated, for example, in U.S. Pat. No. 6,211,309. By contrast, the term "immiscible," as used herein, denotes a blend that shows at least 2, randomly mixed, phases and exhibits more than one Tg. Some polymers may be immiscible and yet compatible with the sulfopolyester. A further general description of miscible and immiscible polymer blends and the various analytical techniques for their characterization may be found in Polymer Blends Volumes 1 and 2, Edited by D. R. Paul and C. B. Bucknall, 2000, John Wiley & Sons, Inc.

Non-limiting examples of water-dispersible polymers that may be blended with the sulfopolyester are polymethacrylic acid, polyvinyl pyrrolidone, polyethylene-acrylic acid copolymers, polyvinyl methyl ether, polyvinyl alcohol, polyethylene oxide, hydroxy propyl cellulose, hydroxypropyl methyl cellulose, methyl cellulose, ethyl hydroxyethyl cellulose, isopropyl cellulose, methyl ether starch, polyacrylamides, poly(N-vinyl caprolactam), polyethyl oxazoline, poly (2-isopropyl-2-oxazoline), polyvinyl methyl oxazolidone, polyvinyl methyl oxazolidimone, poly(2,4-dimethyl-6-triazinylethylene), and ethylene oxide-propylene oxide copolymers. Examples of polymers which are water non-dispersible that may be blended with the sulfopolyester include, but are not limited to, polyolefins, such as homo- and copolymers of polyethylene and polypropylene; poly(ethylene terephthalate); poly(butylene terephthalate); and polyamides, such as nylon-6; polylactides; caprolactone; Eastar Bio® (poly(tetramethylene adipate-co-terephthalate), a product of Eastman Chemical Company); polycarbonate; polyurethane; and polyvinyl chloride.

Further, blends of more than one sulfopolyester may be used to tailor the end-use properties. Thus, blending may also be exploited to alter the processing characteristics of a sulfopolyester.

The sulfopolyester and supplemental polymer may be blended in batch, semicontinuous, or continuous processes, or by melt extrusion.

Thus there is also provided an aqueous coating composition comprising:
A. a sulfopolyester present in an amount of 5 to about 95 weight %, or 5 to 50 wt %, or 5 to 35 wt %, based on the weight of the total resin solids of (A) and (C), said sulfopolyester containing residues of 2,2,4,4-tetraalkylcyclobutanediol; and
B. water present in an amount of 50 to about 85 weight % based on the weight of the aqueous coating composition
C. a polymer resin present in an amount of 5 wt % to about 95 wt %, or 30 to 95 wt %, or 50 to 95 wt %, or 60 to 95 wt %, based on the weight of the total resin solids of (A) and (C).

The polymer resin of (C) may be any type of resins typically used for coating applications including polyester, polyester-amids, polyamides, alkyds, acrylic, latex, polyurethane, epoxy, vinyl polymers, polyisocyanates, melamines, phenolics, urea resins and cellulosic polymers with alkyd emulsion, latex emulsion, and polyurethane dispersion being preferred.

Water-based coating compositions may comprise pigments (organic or inorganic) and/or other additives and fillers known in the art. Such additives are generally present in a range of about 0.1 to 15 weight percent, based on the total weight of the coating composition. For example, an aqueous paint composition may comprise a pigment and one or more additives or fillers used in the paints. Such additives or fillers include, but are not limited to, leveling, rheology, and flow control agents such as silicones, fluorocarbons, urethanes, or cellulosics; extenders; curing agents such as multifunctional isocyanates, multifunctional carbonates, multifunctional epoxides, or multifunctional acrylates; reactive coalescing aids such as those described in U.S. Pat. No. 5,349,026 (which are incorporated here by reference); flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; drying agents; catalysts; crosslinking agents; or coalescing agents. Specific examples of such additives can be found in *Raw Materials Index*, (published by the National Paint & Coatings Association, 1500 Rhode Island Avenue, NW, Washington, D.C. 20005), which is incorporated here by reference. Examples of flatting agents include synthetic silica, available from the Davison Chemical Division of W. R. Grace & Company under the trademark SYLOID™; polypropylene, available from Hercules Inc., under the trademark HERCOFLAT™; synthetic silicate, available from J. M Huber Corporation under the trademark ZEOLEX™; and polyethylene.

Examples of dispersing agents and surfactants include sodium bis(tridecyl) sulfosuccinnate, di(2-ethylhexyl) sodium sulfosuccinnate, sodium dihexylsulfosuccinnate, sodium dicyclohexyl sulfosuccinnate, diamyl sodium sulfosuccinnate, sodium diisobutyl sulfosuccinate, disodium isodecyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-oxtadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all are available from BYK Chemie U.S.A. under the trademark ANTI TERRA™. Further examples include polysiloxane copolymers, polyacrylate solution, cellulose esters, hydroxyethyl cellulose, hydrophobically modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the trademark BRUBREAK of Buckman Laboratories Inc., under the BYK™ trademark of BYK Chemie, U.S.A., under the FOAMASTER™ and NOPCO™ trademarks of Henkel Corp./Coating Chemicals, under the DREWPLUS™ trademark of the Drew Industrial Division of Ashland Chemical Company, under the TROYSOL™ and TROYKYD™ trademarks of Troy Chemical Corporation, and under the SAG™ trademark of Union Carbide Corporation.

Examples of fungicides, mildewcides, and biocides include 4,4-dimethyloxazolidine, 3,4,4-trimethyl-oxazolidine, modified barium metaborate, potassium N-hydroxymethyl-N-methyldithiocarbamate, 2-(thiocyano-methylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the trade name Cyasorb UV, and available from Ciba Geigy under the trademark TINUVIN, and diethyl-3-acetyl-4-hydroxy-benzyl-phosphonate, 4-dodecyloxy-2-hydroxy benzophenone, and resorcinol monobenzoate.

To prepare coated articles according to the present invention, a formulated coating composition containing the sulfopolyester of the present invention is applied to a substrate and allowed to dry. The substrate can be, for example, wood; plastic; metal, such as aluminum or steel; cardboard; glass; cellulose acetate butyrate sheeting; and various blends containing, for example, polypropylene, polycarbonate, polyesters such as polyethylene terephthalate, acrylic sheeting, as well as other solid substrates.

Pigments suitable for use in the coating compositions according to the present invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include, but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1.

The coating composition may be applied to a variety of surfaces, substrates, or articles, e.g., paper, plastic, steel, aluminum, wood, gypsum board, concrete, brick, masonry, or galvanized sheeting (either primed or unprimed). The type of surface, substrate, or article to be coated generally determines the type of coating formulation used. The coating formulation may be applied using means known in the art. For example, a coating formulation may be applied by spraying, brushing, rolling or any other application method to coat a substrate. In general, the coating may be dried by heating but preferably is allowed to air dry. Advantageously, a coating employing a polymer of the invention may be thermally or ambiently cured. As a further aspect, the invention relates to a shaped or formed article which has been coated with a coating formulation of the invention. Examples of coating applications suitable for the coating compositions of the present invention include interior and exterior architectural coatings, industrial wood coatings, general metal coatings, and printing ink coatings.

EXAMPLES

Example 1

Preparation of Masterbatch NPG/SIP Adduct

A master batch of the NPG/SIP adduct was prepared for use in the sulfopolyester polymers synthesis. To a two-liter, three-neck, round-bottom flask equipped with a mechanical stirrer, a heated partial condenser, a Dean-Stark adapter, and a water condenser were charged neopentyl glycol 758.26 g (7.29 mole), 5-sodiosulfoisophthalic acid 491.12 (2.92 mole), distilled water 84 g, and the catalyst, Fascat 4100 (Arkema Inc.) 1.014 g. The reaction mixture was gradually heated to 90° C. to allow for the formation of a slurry, which was subsequently heated to 115° C. The resulting water distillate was collected in the Dean-Stark trap. After stirring for about one hour, a total of 45 ml water was collected. The reaction was allowed to continue at 130° C. for 30 min., at 150° C. for 30 min., at 170° C. for one hour, and finally at 190° C. for about 5 hours until the reaction mixture was substantially free of particulate solids. A total of 192 ml distillate was collected. The mixture was allowed to cool to about 100° C. and subsequently collected before it solidified. A clear solid mass was obtained, which was broken up and stored.

Comparative Example 2

Synthesis of Sulfopolyester #1 without TMCD
(SIP=12.2 Mole %, Based on Total Diacids)

The reactants: 1,4-cycicohexane dimethanol CHDM 90 (90% CHDM in water) in an amount of 48.15 g or 0.301 moles, the NPG/SIP adduct in an amount of 30.00 g, isophthalic acid in an amount of 11.77 g, or 0.071 moles, and dimethyl terephthalate in an amount of 55.01 g, or 0.284 moles, and the acid catalyst, Fascat 4100 (0.22 g), were charged to a 500-mL, three-neck, round-bottom flask equipped with a mechanical stirrer, a heated partial condenser, a Dean-Stark adapter, and a water condenser. The reaction mixture was allowed to react under nitrogen at 190° C. for 20 min., at 200° C. for one hour, at 220° C. for one hour, and at 240° C. for 1.5 hours to yield a viscous mixture. A total of 24 mL distillate was collected in the Dean-Stark trap. The reactor was then reassembled to be connected to a glass vacuum tube for further reaction under reduced pressures. The reaction was allowed to continue at 240° C. under vacuum (gradually reduced to 2 mmHg) for 25 min. to yield a highly viscous mixture. A hard, solid product was obtained after the resulting mixture was cooled. (Tg 86.4° C.; Mn 1942, Mw 7636)

Comparative Example 3

Preparation of Aqueous Dispersion 1 Using
Sulfopolyester #1 (Comparative)

Sulfopolyester #1 (about 55 g) was first pulverized by using a blender. A mixture of water (106.25 g) and the co-solvent, ethylene glycol monobutyl ether (EB) (2.50 g) was prepared in a three-neck round-bottom flask equipped with a mechanical stirrer and a water condenser and subsequently heated to 90° C. To the stirred mixture was gradually added the sulfopolyester polymers powder (50 g) in small increments. A water defoamer, BYK-025 (BYK-Chemie) (0.125 g), was also added during the addition. The addition was complete in about one hour to yield a dispersion, which was found to contain a significant amount of un-dispersed resin pieces. Additional EB (2.50 g) was added to help disperse the resin. Subsequently, additional water (first 11.90 g and then 13.74 g) was added in an attempt to further disperse the resin. The stirring was allowed to continue for two more hours, and the final portion (7.7 g) of water was added to reduce the % solids to 25%. The dispersing process was stopped after 25 more minutes. The resulting dispersion was found to still contain a significant amount of resin pieces and was deemed unfit for use.

Example 4

Synthesis of Sulfopolyester #2 Using CHDM/TMCD=80/20 mole % (SIP=12.2 Mole %, Based on Total Diacids)

The reactants: CHDM 90 (90% CHDM in water) in an amount of 38.52 g or 0.241 moles, TMCD in an amount of 8.67 g or 0.060 moles, NPG/SIP adduct in an amount of 30.00 g, IPA in an amount of 11.77 g or 0.071 moles, and DMT in an amount of 55.01 g or 0.284 moles, and the acid catalyst, Fascat 4100 in an amount of 0.22 g, were charged to a 500-mL, three-neck, round-bottom flask equipped with a mechanical stirrer, a heated partial condenser, a Dean-Stark adapter, and a water condenser. The reaction mixture was allowed to react under nitrogen at 190° C. for 40 min., at 200° C. for 1.5 hours, at 220° C. for 1.5 hours, and at 240° C. for one hour to yield a viscous mixture. A total of 24.5 mL distillate was collected in the Dean-Stark trap. The reactor was then reassembled to be connected to a glass vacuum tube for further reaction under reduced pressures. The reaction was allowed to continue at 240° C. under vacuum (gradually reduced to 5 mmHg) for 40 min. to yield a highly viscous mixture. A hard, solid product was obtained after the resulting mixture was cooled. (Tg 82.4° C.; Mn 1897, Mw 5674)

Example 5

Preparation of Aqueous Dispersions 2 Using Sulfopolyester #2

About 55 g of Sulfopolyester #2 was first pulverized by using a blender. A mixture of water (106.25 g) and the co-solvent, ethylene glycol monobutyl ether (EB) (2.50 g) was prepared in a three-neck round-bottom flask equipped with a mechanical stirrer and a water condenser and subsequently heated to 80° C. To the stirred mixture was gradually added the sulfopolyester polymers powder (50 g) in small increments. The addition was complete in about 30 min.; a viscous dispersion was formed. During the addition, a water defoamer, BYK-025 (BYK-Chemie) (0.125 g), was also added. Additional water (10.42 g) was added in order to reduce the viscosity. The stirring was allowed to continue at 80° C. for one hour, and more water (11.90 g) was added. After stirring for additional 75 min., the mixture was allowed to cool to 60° C. and subsequently collected. The resulting dispersion was filtered to remove traces of particulate substances to yield a homogeneous translucent dispersion. The % solids were determined to be 28.1%.

Example 6

Synthesis of Sulfopolyester #3 Using CHDM/TMCD=70/30 Mole % (SIP=12.2 Mole %, Based on Total Diacids)

The reactants: CHDM 90 (90% CHDM in water) in an amount of 33.71 g or 0.211 moles, TMCD in an amount of 13.00 g or 0.090 moles, NPG/SIP adduct in an amount of 30.00 g, IPA in an amount of 11.77 g or 0.071 moles, and DMT in an amount of 55.01 g, 0.284 moles, and the acid catalyst, Fascat 4100 in an amount of 0.22 g, were charged to a 500-mL, three-neck, round-bottom flask equipped with a mechanical stirrer, a heated partial condenser, a Dean-Stark adapter, and a water condenser. The reaction mixture was allowed to react under nitrogen at 190° C. for 45 min., at 200° C. for 50 min., at 220° C. for 75 min., and at 240° C. for one hour to yield a viscous mixture. A total of 25 mL distillate was collected in the Dean-Stark trap. The reactor was then reassembled to be connected to a glass vacuum tube for further reaction under reduced pressures. The reaction was allowed to continue at 240° C. under vacuum (gradually reduced to 2 mmHg) for 30 min. to yield a highly viscous mixture. A hard, solid product was obtained after the resulting mixture was cooled. (Tg 81.1° C.; Mn 1769, Mw 5194)

Example 7

Preparation of Aqueous Dispersions 3 Using Sulfopolyester #3

Sulfopolyester #3 (about 55 g) was first pulverized by using a blender. A mixture of water (106.25 g) and the co-solvent, ethylene glycol monobutyl ether (EB) (2.50 g) was prepared in a three-neck round-bottom flask equipped with a mechanical stirrer and a water condenser and subsequently heated to 90° C. To the stirred mixture was gradually added the sulfopolyester polymers powder (50 g) in small increments. The addition was complete in about 30 min.; a viscous dispersion was formed. During the addition, a water defoamer, BYK-025 (BYK-Chemie) (0.125 g), was also added. Additional water (5.04 g) was added in order to reduce the viscosity. The stirring was allowed to continue at 90° C. for 30 min., and more water (17.28 g) was added. After stirring for additional 80 min., the mixture was allowed to cool to 60° C. and subsequently collected. The resulting dispersion was filtered to remove traces of particulate substances to yield a homogeneous translucent dispersion. The % solids were determined to be 28.6%.

Example 8

Synthesis of Sulfopolyester #4 Using CHDM/TMCD=50/50 Mole % (SIP=12.2 Mole %, Based on Total Diacids)

The reactants: CHDM 90 (90% CHDM in water) in an amount of 24.08 g or 0.150 moles, TMCD in an amount of 21.67 g or 0.150 moles, NPG/SIP adduct in an amount of 30.00 g, IPA in an amount of 11.77 g or 0.071 moles, and DMT in an amount of 55.01 g or 0.284 moles, and the acid catalyst, Fascat 4100 in an amount of 0.22 g, were charged to a 500-mL, three-neck, round-bottom flask equipped with a mechanical stirrer, a heated partial condenser, a Dean-Stark adapter, and a water condenser. The reaction mixture was allowed to react under nitrogen at 190° C. for 50 min., at 200° C. for 30 min., at 220° C. for 40 min., and at 240° C. for one hour to yield a viscous mixture. A total of 25.5 mL distillate was collected in the Dean-Stark trap. The reactor was then reassembled to be connected to a glass vacuum tube for further reaction under reduced pressures. The reaction was allowed to continue at 240° C. under vacuum (gradually reduced to 3 mmHg) for 40 min. to yield a highly viscous mixture. A hard, solid product was obtained after the resulting mixture was cooled. (Tg 81.8° C.; Mn 1588, Mw 4430)

Example 9

Preparation of Aqueous Dispersions 4 Using Sulfopolyester #4

Sulfopolyester #4 (about 55 g) was first pulverized by using a blender. A mixture of water (106.25 g) and the co-solvent, ethylene glycol monobutyl ether (EB) (2.50 g) was prepared in a three-neck round-bottom flask equipped with a mechanical stirrer and a water condenser and subsequently heated to 90° C. To the stirred mixture was gradually added the sulfopolyester polymers powder (50 g) in small increments. The addition was complete in about 40 min.; a viscous dispersion was formed. During the addition, a water defoamer, BYK-025 (BYK-Chemie) (0.125 g), was also added. After stirring for additional one hour, the mixture was allowed to cool to 60° C. and subsequently collected. The resulting dispersion was filtered to remove traces of particulate substances to yield a homogeneous translucent dispersion. The % solids were determined to be 32.1%.

Example 10

Synthesis of Sulfopolyester #5 Using CHDM/TMCD=50/50 mole % (SIP=10.0 mole %, based on total diacids)

The reactants: CHDM 90 (90% CHDM in water) in an amount of 21.82 g or 0.136 moles, TMCD in an amount of 19.63 g or 0.136 moles, NPG/SIP adduct in an amount of 20.00 g, IPA in an amount of 9.81 g or, 0.059 moles, and DMT in an amount of 45.87 g or 0.236 moles, and the acid catalyst, Fascat 4100 (0.18 g), were charged to a 500-mL, three-neck, round-bottom flask equipped with a mechanical stirrer, a heated partial condenser, a Dean-Stark adapter, and a water condenser. The reaction mixture was allowed to react under nitrogen at 190° C. for one hour, at 200° C. for 40 min., at 220° C. for 80 min., and at 240° C. for 40 min. to yield a viscous mixture. A total of 16.5 mL distillate was collected in the Dean-Stark trap. The reactor was then reassembled to be connected to a glass vacuum tube for further reaction under reduced pressures. The reaction was allowed to continue at 240° C. under vacuum (gradually reduced to 10 mmHg) for 35 min. to yield a highly viscous mixture. A hard, solid product was obtained after the resulting mixture was cooled. (Tg 81.2° C.; Mn 2195, Mw 5882)

Example 11

Preparation of Aqueous Dispersions 5 Using Sulfopolyester #5

Sulfopolyester #5 (about 55 g) was first pulverized by using a blender. A mixture of water (106.25 g) and the co-solvent, ethylene glycol monobutyl ether (EB) (2.50 g) was prepared in a three-neck round-bottom flask equipped with a mechanical stirrer and a water condenser and subsequently heated to 90° C. To the stirred mixture was gradually added the sulfopolyester polymers powder (50 g) in small increments. The addition was complete in about 70 min.; a viscous dispersion was formed. During the addition, a water defoamer, BYK-025 (BYK-Chemie) (0.125 g), was also added. After stirring for additional 3 hours at 95° C., the mixture was allowed to cool to 60° C. and subsequently collected. The resulting dispersion was filtered to remove traces of particulate substances to yield a homogeneous translucent dispersion. The % solids were determined to be 32.7%.

Comparative Example 12

Synthesis of Sulfopolyester #6 without TMCD (SIP=10.0 Mole %, Based on Total Diacids)

The reactants: CHDM 90 (90% CHDM in water) in an amount of 43.63 g or 0.273 moles, NPG/SIP adduct in an amount of 20.00 g, IPA in an amount of 9.81 g or 0.059 moles, and DMT in an amount of 45.87 g or 0.236 moles, and the acid catalyst, Fascat 4100 (0.18 g), were charged to a 500-mL, three-neck, round-bottom flask equipped with a mechanical stirrer, a heated partial condenser, a Dean-Stark adapter, and a water condenser. The reaction mixture was allowed to react under nitrogen at 190° C. for one hour, at 200° C. for one hour, at 220° C. for 30 min., and at 240° C. for 15 min. to yield a viscous mixture. A total of 21 mL distillate was collected in the Dean-Stark trap. The reactor was then reassembled to be connected to a glass vacuum tube for further reaction under reduced pressures. The reaction was allowed to continue at 240° C. under vacuum (gradually reduced to 8 mmHg) for 30 min. to yield a highly viscous mixture. A hard, solid product was obtained after the resulting mixture was cooled. (Tg 71° C.; Mn 2169, Mw 7682)

Comparative Example 13

Preparation of Aqueous Dispersions 6 Using Sulfopolyester #6

Sulfopolyester #6 (about 55 g) was first pulverized by using a blender. A mixture of water (106.25 g) and the co-solvent, ethylene glycol monobutyl ether (EB) (2.50 g) was prepared in a three-neck round-bottom flask equipped with a mechanical stirrer and a water condenser and subsequently heated to 90° C. To the stirred mixture was gradually added the sulfopolyester polymers powder (50 g) in small increments. The addition was complete in about one hour; the mixture became a slurry containing mostly un-dispersed powders (brick dust like). During the addition, a water defoamer, BYK-025 (BYK-Chemie) (0.125 g), was also added. An additional amount (2.5 g) of EB was added in an attempt to disperse the resin. The stirring was allowed to continue at 95° C. for another two hours. The mixture remained as a slurry containing mostly un-dispersed resin powders and was deemed not water dispersible.

What we claim is:
1. An aqueous dispersion comprising:
A. a sulfopolyester present in an amount of 25 to about 35 weight %, based on the weight of the aqueous composition, said sulfopolyester containing residues of 2,2,4,4-tetraalkylcyclobutanediol (TACD) and having a $T_g$ of at least 65° C.; and
B. water present in an amount of 65 to about 75 weight %, based on the weight of the aqueous compositions;

wherein the sulfopolyester (A) comprises the reaction product of:
- (i) a polyhydroxyl component comprising:
  - a. TACD in an amount ranging from 10 mole % to 60 mole %, based on the moles of the polyhydroxyl component, and
  - b. a polyhydroxyl compound comprising 1,4-cyclohexanedimethanol (CHDM) in an amount ranging from 40 mole % to 90 mole %, based on the moles of the polyhydroxyl component; and
- (ii) an acid component comprising:
  - a. isophthalic acid, dimethyl isophthalate, terephthalic acid, dimethyl terephthalate, or a mixture thereof, in a cumulative amount from 85 mole % to 95 mole %, based on the moles of the acid component, and
  - b. a sulfomonomer in an amount ranging from 5 mole % to 15 mole %, based on the moles of the acid component.

2. The dispersion of claim 1, further comprising an organic co-solvent present in an amount of up to 10 wt %, based on the weight of the dispersion.

3. The dispersion of claim 1, wherein the dispersion contains no more than 1 wt % undispersed solids before filtering the dispersion.

4. The dispersion of claim 1, wherein residues of TACD comprise residues of 2,2,4,4-tetramethylcyclobutane-1,3-diol.

5. A dispersion comprising an aqueous dispersion comprising:
- A. a sulfopolyester present in an amount of 25 to about 35 weight %, based on the weight of the aqueous composition, said sulfopolyester containing residues of 2,2,4,4-tetraalkylcyclobutanediol (TACD) and having a $T_g$ of at least 65° C. and comprising the reaction product of:
  - (i) a polyhydroxyl component comprising:
    - a. TACD in an amount ranging from 10 mole % to 60 mole %, based on the moles of the polyhydroxyl component, and
    - b. a polyhydroxyl compound comprising 1,4-cyclohexanedimethanol (CHDM), in an amount ranging from 40 mole % to 90 mole %, based on the moles of the polyhydroxyl component; and
  - (ii) an acid component comprising:
    - a. isophthalic acid, dimethyl isophthalate, terephthalic acid, dimethyl terephthalate, or a mixture thereof, in a cumulative amount from 85 mole % to 95 mole %, based on the moles of the acid component, and
    - b. a sulfomonomer in an amount ranging from 5 mole % to 15 mole %, based on the moles of the acid component; and
- B. water present in an amount of 65 to about 75 weight %, based on the weight of the aqueous composition.

6. The dispersion of claim 5, wherein said sulfopolyester contains residues of 2,2,4,4-tetramethylcyclobutanediol (TMCD) and said sulfopolyester comprising the reaction product of:
- (i) a polyhydroxyl component comprising:
  - a. TMCD in an amount ranging from 10 mole % to 60 mole %, based on the moles of the polyhydroxyl component, and
  - b. a polyhydroxyl compound further comprising neopentyl glycol in a cumulative amount ranging from 40 mole % to 90 mole %, based on the moles of the polyhydroxyl component; and
- (ii) an acid component comprising:
  - a. dimethyl terephthalate, in a cumulative amount from 85 mole % to 95 mole %, based on the moles of the acid component, and
  - b. a sulfomonomer in an amount ranging from 5 mole % to 15 mole %, based on the moles of the acid component.

7. The dispersion of claim 5, wherein said sulfopolyester contains residues of 2,2,4,4-tetramethylcyclobutanediol (TMCD) and said sulfopolyester comprising the reaction product of:
- (i) a polyhydroxyl component comprising:
  - a. TMCD in an amount ranging from 10 mole % to 60 mole %, based on the moles of the polyhydroxyl component, and
  - b. a polyhydroxyl compound comprising 1,4-cyclohexanedimethanol (CHDM) in an amount ranging from 40 mole % to 90 mole %, based on the moles of the polyhydroxyl component; and
- (ii) an acid component comprising:
  - a. dimethyl terephthalate, in a cumulative amount from 85 mole % to 95 mole %, based on the moles of the acid component, and
  - b. a sulfomonomer in an amount ranging from 5 mole % to 15 mole %, based on the moles of the acid component.

* * * * *